United States Patent
Al-Qasim et al.

(10) Patent No.: US 10,612,360 B2
(45) Date of Patent: Apr. 7, 2020

(54) RING ASSEMBLY FOR MEASUREMENT WHILE DRILLING, LOGGING WHILE DRILLING AND WELL INTERVENTION

(71) Applicant: Saudi Arabian Oil Company, Dhahran (SA)

(72) Inventors: Abdulaziz S. Al-Qasim, Dhahran (SA); Alberto Marsala, Venice (IT)

(73) Assignee: Saudi Arabian Oil Company, Dhahran (SA)

( * ) Notice: Subject to any disclaimer, the term of this patent is extended or adjusted under 35 U.S.C. 154(b) by 43 days.

(21) Appl. No.: 15/829,485

(22) Filed: Dec. 1, 2017

(65) Prior Publication Data

US 2019/0169975 A1 Jun. 6, 2019

(51) Int. Cl.
| | |
|---|---|
| *E21B 47/00* | (2012.01) |
| *G01V 1/52* | (2006.01) |
| *G01N 21/952* | (2006.01) |
| *G01V 11/00* | (2006.01) |
| *E21B 23/01* | (2006.01) |
| *G01D 11/24* | (2006.01) |
| *G01N 21/954* | (2006.01) |
| *E21B 23/00* | (2006.01) |
| *E21B 47/01* | (2012.01) |
| *E21B 47/06* | (2012.01) |
| *E21B 47/10* | (2012.01) |
| *E21B 47/12* | (2012.01) |

(52) U.S. Cl.
CPC ............. *E21B 47/00* (2013.01); *E21B 23/01* (2013.01); *G01D 11/245* (2013.01); *G01N 21/952* (2013.01); *G01V 1/52* (2013.01); *G01V 11/005* (2013.01); *E21B 47/0002* (2013.01); *E21B 47/011* (2013.01); *E21B 47/06* (2013.01); *E21B 47/065* (2013.01); *E21B 47/10* (2013.01); *E21B 47/122* (2013.01); *E21B 2023/008* (2013.01); *G01N 21/954* (2013.01); *G01V 2001/526* (2013.01); *G01V 2200/16* (2013.01)

(58) Field of Classification Search
CPC .................................. E21B 47/00; E21B 23/01
See application file for complete search history.

(56) References Cited

U.S. PATENT DOCUMENTS

| | | |
|---|---|---|
| 2,973,996 A | 3/1961 | Self |
| 3,268,003 A | 8/1966 | Essary |

(Continued)

FOREIGN PATENT DOCUMENTS

| | | |
|---|---|---|
| CN | 105134101 A | 12/2015 |
| DE | 10253123 A1 | 5/2004 |

OTHER PUBLICATIONS

International Search Report and Written Opinion for related PCT application PCT/US2018/063291 dated Mar. 7, 2019.

*Primary Examiner* — Jamel E Williams
(74) *Attorney, Agent, or Firm* — Bracewell LLP; Constance G. Rhebergen; Linda L. Morgan

(57) ABSTRACT

System and methods for measuring properties within a subterranean well include a ring assembly. The ring assembly includes a structural ring sized with a ring inner diameter to circumscribe a tubular string and a ring outer diameter to fit within a bore of the subterranean well. A measurement tool is integrated with the structural ring. Wheels are spaced around an inner diameter surface of the structural ring.

18 Claims, 4 Drawing Sheets

(56) References Cited

U.S. PATENT DOCUMENTS

| | | | |
|---|---|---|---|
| 3,364,464 A * | 1/1968 | Dellinger | E21B 47/082 |
| | | | 166/241.5 |
| 4,384,625 A | 5/1983 | Roper et al. | |
| 4,791,998 A | 12/1988 | Hempkins et al. | |
| 5,375,476 A | 12/1994 | Gray | |
| 5,517,024 A | 5/1996 | Mullins et al. | |
| 5,692,563 A | 12/1997 | Krueger et al. | |
| 5,715,898 A | 2/1998 | Anderson | |
| 6,148,917 A | 11/2000 | Brookey et al. | |
| 6,209,667 B1 | 4/2001 | Murray et al. | |
| 6,382,333 B1 | 5/2002 | Murray | |
| 6,585,043 B1 | 7/2003 | Murray | |
| 6,637,524 B2 | 10/2003 | Kruspe et al. | |
| 6,942,043 B2 | 9/2005 | Kurkoski | |
| 7,036,611 B2 | 5/2006 | Radford et al. | |
| 7,096,961 B2 | 8/2006 | Clark et al. | |
| 7,980,331 B2 * | 7/2011 | Hall | E21B 41/0085 |
| | | | 166/65.1 |
| 8,333,254 B2 | 12/2012 | Hall et al. | |
| 8,733,455 B2 | 5/2014 | Shaikh et al. | |
| 9,097,820 B2 | 8/2015 | Rasheed | |
| 9,267,331 B2 | 2/2016 | Radford et al. | |
| 9,284,784 B2 | 3/2016 | Zaki et al. | |
| 9,528,338 B2 | 12/2016 | Hall | |
| 2003/0159834 A1 | 8/2003 | Kirk et al. | |
| 2004/0007355 A1 | 1/2004 | Hern et al. | |
| 2010/0235018 A1 | 9/2010 | Christ | |
| 2016/0059939 A1 | 3/2016 | Lamonby et al. | |
| 2019/0100994 A1 * | 4/2019 | Vecseri | E21B 47/187 |

\* cited by examiner

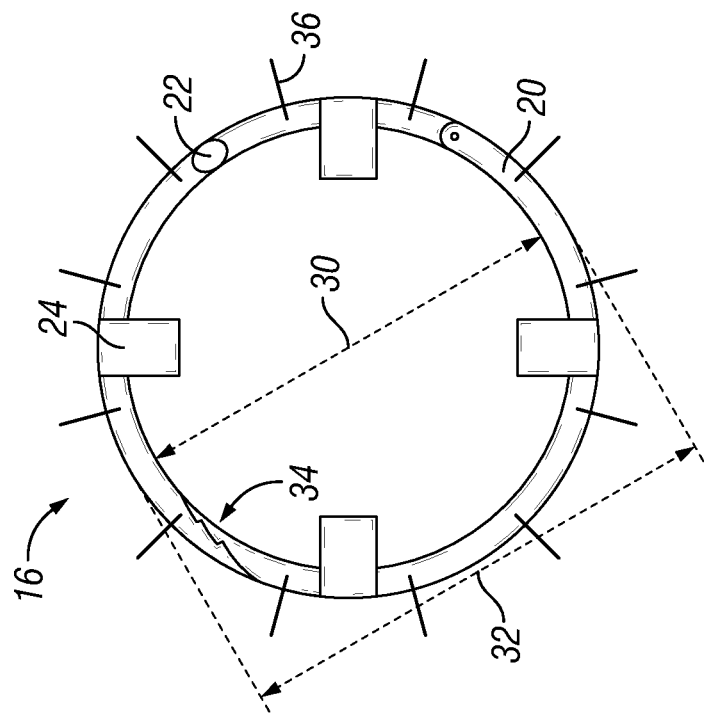
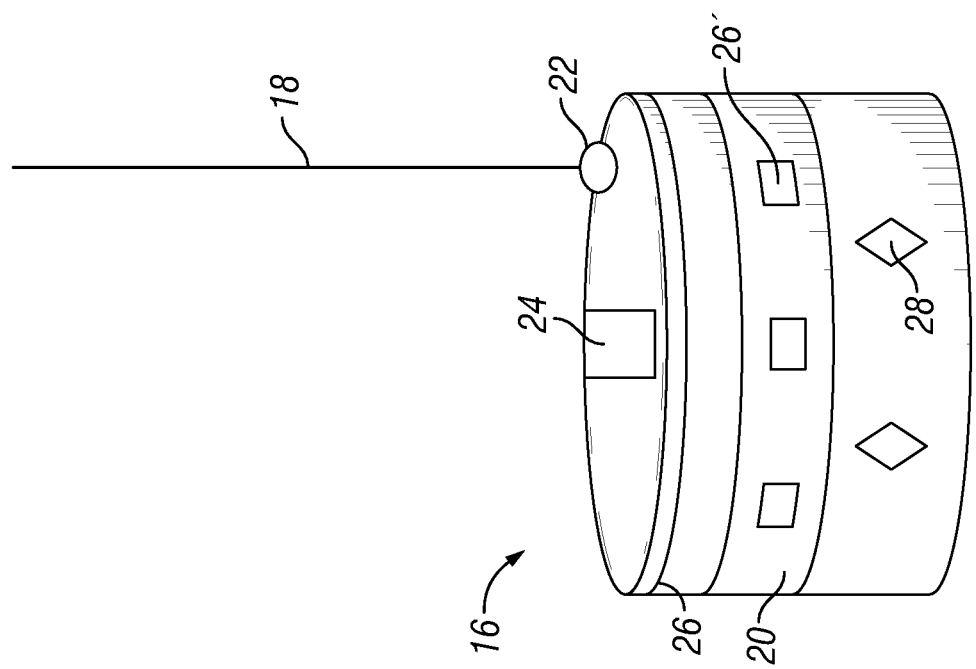

RING ASSEMBLY FOR MEASUREMENT WHILE DRILLING, LOGGING WHILE DRILLING AND WELL INTERVENTION

BACKGROUND OF THE DISCLOSURE

1. Field of the Disclosure

The disclosure relates generally to hydrocarbon development operations in a subterranean well, and more particularly to measuring properties of a formation and performing well intervention procedures during and after well drilling operations.

2. Description of the Related Art

Logging while drilling (LWD) and measurement while drilling (MWD) techniques were developed to support and enhance decisions being made during rotary drilling operations. LWD and MWD procedures can provide a snapshot of data relating to the drilling operations and the conditions of the subterranean well, such as weight on bit (WOB), porosity, resistivity, formation pressure, borehole inclination and azimuth, and other formation properties and drilling mechanics information. In currently available systems, the MWD and LWD tools are attached to the bottom hole assembly and provide a discrete real time snapshot of the information as the bottom hole assembly passes through the formation.

SUMMARY OF THE DISCLOSURE

Embodiments of this disclosure include systems and methods for gathering logging and measurement data along a bore of a subterranean well at any time. In some currently available systems the MWD and LWD tools are attached to the bottom hole assembly and provide a discrete snapshot of the information only as the bottom hole assembly passes through the formation. Such currently available systems are unable to capture logging and measurement data at a target location after the bottom hole assembly has already passed through such a target location. Conditions within a subterranean well can change over time. Systems and method of this disclosure are able to capture such changes by providing continuous, intermittent, or on demand real time logging or measurement data.

Systems and methods of the embodiments of this disclosure provide a ring assembly that can be secured around the tubular string and lowered from the surface at any time during drilling or post drilling operations. The ring assembly has measurement tools for gathering logging and measurement data. The ring assemblies can also perform intervention operations on the tubular string, bore of the subterranean well, or the formation. An internal scanner can assess the tubular string. Wheels that are located on an inner diameter of the ring assembly can allow for the ring assembly to move over joint connections and other obstructions along the tubular string. The ring assemblies can be deployed in arrays and can move both uphole and downhole, as desired, for gathering the logging and measurement data.

In an embodiment of this disclosure, a system for measuring properties within a subterranean well has a ring assembly. The ring assembly includes a structural ring sized with a ring inner diameter to circumscribe a tubular string and a ring outer diameter to fit within a bore of the subterranean well. A measurement tool is integrated with the structural ring. Wheels are spaced around an inner diameter surface of the structural ring.

In alternate embodiments, the measurement tool can be a logging tool. Alternately, the measurement tool can be a scanner, a camera, a pressure sensor, a temperature sensor, flow sensor, a caliper sensor, and combinations of such tools. The measurement tool can alternately be a scanner directed towards the tubular string, the scanner operable to assess the tubular string.

In other alternate embodiments, the ring assembly can further include an axial movement system operable to move the ring assembly downhole and uphole within the subterranean well. The axial movement system can include a motor operable to move the ring assembly within the subterranean well. The ring assembly can further include a communication system operable to provide real time data to a surface from the measurement tool. The structural ring can be a jointed member moveable between an open position and a closed position, where in the open position the structural ring is operable to be positioned around a joint of the tubular string. The structural ring can include a latching mechanism, the latching mechanism operable to connect ends of the jointed member.

In an alternate embodiment of this disclosure, a method for measuring properties within a subterranean well includes positioning a ring assembly around a tubular string. The ring assembly includes a structural ring sized with a ring inner diameter to circumscribe the tubular string and a ring outer diameter to fit within a bore of the subterranean well. A measurement tool is integrated with the structural ring. Wheels are spaced around an inner diameter surface of the structural ring. The method further includes measuring a property within the subterranean well with the measurement tool.

In alternate embodiments, the measurement tool can be a logging tool. Alternately, the measurement tool can be a scanner, a camera, a pressure sensor, a temperature sensor, flow sensor, a caliper sensor, or a combinations of such tools. The measurement tool can alternately be a scanner directed towards the tubular string, and the method can include scanning the tubular string to assess the property of the tubular string.

In other alternate embodiments, the ring assembly can further include an axial movement system, and the method can further include moving the ring assembly downhole and uphole within the subterranean well with the axial movement system. The axial movement system can include a motor and the method can further include moving the ring assembly within the subterranean well with the motor. The ring assembly can further include a communication system and the method can further include providing real time data to a surface from the measurement tool with the communication system. The structural ring can be a jointed member moveable between an open position and a closed position and the method further includes positioning the structural ring around a joint of the tubular string with the jointed member in the open position. The structural ring can include a latching mechanism and the method can further include connecting ends of the jointed member with the latching mechanism.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

FIG. 2 is a schematic perspective view of a ring assembly supported by a control line, in accordance with an embodiment of this disclosure.

FIG. 3 is schematic plan view of a ring assembly, in accordance with an embodiment of this disclosure.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
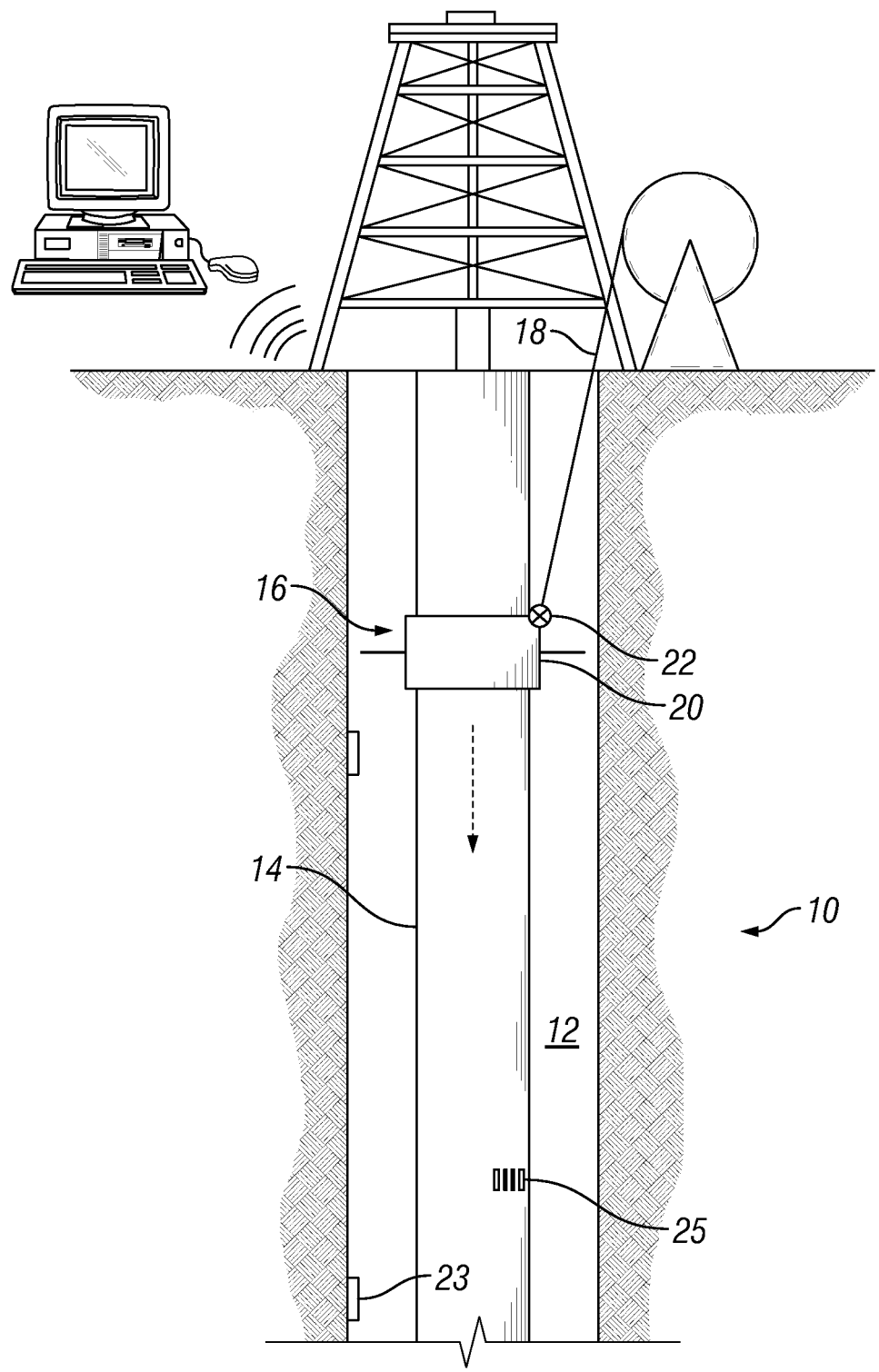
FIG. 1 is a schematic sectional representation of a subterranean well having a ring assembly, in accordance with an embodiment of this disclosure.

Looking at FIG. 1, subterranean well 10 extends downwards from a surface of the earth, which can be a ground level surface or a subsea surface. Bore 12 of subterranean well 10 can extended generally vertically relative to the surface, as shown in FIG. 1. Alternately, bore 12 can include portions that extend generally horizontally or in other directions that deviate from generally vertically from the surface. Subterranean well 10 can be a well associated with hydrocarbon development operations, such as a hydrocarbon production well, an injection well, or a water well.

Tubular string 14 extends into bore 12 of subterranean well 10. Tubular string 14 can be, for example, a drill string, a casing string, or another elongated member lowered into the subterranean well. Although bore 12 is shown as an uncased opening, in embodiments where tubular string 14 is an inner tubular member, bore 12 can be part of an outer tubular member, such as casing.

Ring assembly 16 can be used to gather logging and measurement data within bore 12. In the example of FIG. 1, ring assembly 16 is lowered on control line 18, which can both support ring assembly 16 and be used for communication with ring assembly 16. Ring assembly 16 can include structural ring 20. Structural ring 20 is formed of a heavy material so that the force of gravity causes ring assembly 16 to drop into and fall through bore 12. As an example, structural ring 20 can be formed of tungsten turbid coated with materials that prevent corrosion, or a carbon steel mixed with chrome. The density of structural ring 20 can be higher than the density of tubular string 14.

Control line 18 can communicate with ring assembly 16 through communication and control assembly 22 of ring assembly 16. Communication and control assembly 22 can be part of a wired or wireless telemetry communication system. Communication and control assembly 22 can include a communication coupling that provides for two-way power and data communication between ring assembly 16 and the surface by way of control line 18. As an example control line 18 can transmit analog or digitalized data by way of electric cables or fiber optic components of control line 18. The communication coupling can be for example, an inductive type coupling or other known power and data coupling. In addition to the communication coupling, control line 18 can be mechanically secured to structural ring 20 for supporting ring assembly 16 within bore 12.

In alternate embodiments, communication between ring assembly 16 and the surface can be accomplished through wireless telemetry methods and communication, and control assembly 22 can generate a signal that will be received at the surface. In such an embodiment, the digitized data can be transmitted by communication and control assembly 22 to the surface in an electromagnetic wave. As an example, the data can be transmitted in a radio frequency. To allow for communication and data transmission in a deep subterranean well 10, such as wells greater than 1000 meters (m) or wells greater than 10,000 m, data transmitting and receiving stations 23 can be positioned at intervals along bore 12 to relay the data between ring assembly 16 and the surface. A display unit can be located at the surface to receive and display data transmitted to the surface from ring assembly 16.

Ring assembly 16 can include a power source that can be sized to fit within or communicate with ring assembly 16. As an example, ring assembly 16 can be powered by way of a power signal provided through control line 18. In alternate embodiments, ring assembly 16 can be powered by other known methods, such as from the mud or other fluid flow through bore 12 or by batteries, the systems of which are part of communication and control assembly 22.

Ring assembly 16 has an axial movement system for moving ring assembly 16 both downhole and uphole within subterranean well 10. As an example, communication and control assembly 22 of ring assembly 16 can include a motor operable to move structural ring 20 within the subterranean well. Communication and control assembly 22 can, for example, be part of a system that can move ring assembly 16 both uphole and downhole for obtaining real time logging and measuring data at a variety of locations. Each joint of tubular string 14 can include a unique barcode 25 so that ring assembly 16 can identify the relative location of ring assembly 16 along tubular string 14.

Looking at FIG. 2, ring assembly 16 can have wheels 24. Wheels 24 are spaced around an inner diameter surface of structural ring 20. Wheels 24 can rotate in various directions to allow structural ring 20 to both rotate around tubular string 14 or to move axially along tubular string 14. Wheels 24 can help to center structural ring 20 around tubular string 14 and can include flexible bearings so that structural ring 20 can pass over joint connections and other obstructing members of tubular string 14.

Wheels 24 can be formed of a material that can withstand conditions within subterranean well 10, such as temperatures greater than 175 degrees Celsius, abrasive materials such as cuttings and other rock debris, and corrosive fluids such as hydrogen sulfide gas. As an example, wheels 24 can be formed of a plastic material such as polytetrafluoroethylene. Wheels 24 can alternately include a flexible material, such as a rubber, that can grip tubular string 14 and can be deformed as wheels 24 pass over joint connections or other obstructing members of tubular string 14.

Alternately, wheels 24 can be otherwise biased outward and retractable to pass over joint connections or other obstructing members of tubular string 14. As an example, wheels 24 can be omnidirectional spherical wheels formed of stainless steel, carbon, fiber, or fiberglass core members covered with rubber to increase the grip of wheels 24 on tubular string 14. In certain embodiments, wheels 24 can be controlled autonomously by way of communication and control assembly 22 for moving or driving ring assembly 16.

The outer diameter for connections is slightly bigger than tubular, having a slightly flexible bearing for wheels to accommodate slight increase in outer diameter like the tractor technology.

Ring assembly 16 can include measurement tool 26 that is integrated with structural ring 20. Measurement tool 26 can be designed to withstand the sustained pressures and temperatures of the environment of bore 12. Measurement tool 26 can be used to continuously or intermittently obtain measurements within bore 12 (FIG. 1) and provide real time data relating to such measurements to the surface through the wired or wireless telemetry system of communication and control assembly 22. Measurement tool 26 can remain static within bore 12 (FIG. 1) while performing logging or measurement operations, or can move either uphole or downhole while performing measurement operations.

Looking at FIG. 2, ring assembly 16 can include one or more measurement tools 26, 26'. One or more measurement tools 26, 26' can be integrated into each structural ring 20 and ring assembly 16 can include more than one structural ring 20. Ring assembly 16 has a modular design so that an operator can select an appropriate ring assembly 16 with integrated measurement tools 26, 26' for performing the desired logging, measuring, or intervention operation, for example by combining multiple structural rings 20 in order to include each the logging, measuring, or intervention operations desired. In the example embodiment of FIG. 2, three structural rings 20 are stacked together. In alternate embodiments, one or two structural rings 20 may be used, or more than three structural rings 20 can be used.

For logging operations, measurement tool 26 can be a logging tool that includes an electromagnetic logging tool, an induction tool, an acoustic tool, a nuclear magnetic resonance tool, a nuclear tool, or a tool with other known type of logging while drilling technology. In embodiments of this disclosure, the logging operations can be performed during or after drilling operations and can provide information relating to identifying the oil, water, and gas zones.

Measurement tool 26 can alternately include other sensors and equipment, such as a scanner, a camera, a pressure sensor, a temperature sensor, flow sensor, a caliper sensor, a microscope, a scraper, or any combination of such sensors and equipment. The scanner can be directed towards tubular string 14 for assessing tubular string 14. The camera can capture images from within bore 12. The pressure sensor, temperature sensor, and flow sensor can provide data relating to a pressure, temperature and flow rate within bore 12, respectively. The caliper can measure a distance between tubular string 14 and the inner diameter surface of bore 12. The microscope can provide more detailed images from within bore 12. The scraper can be a metal point, blade, or plate that scratches the rock in the interior of bore 12. The scraper can be equipped with a load cell and a strain gauge which indicate the force needed to indent the rock adjacent to bore 12 so that the depth of penetration of the scraper can provide an index of the rock strength.

In alternate embodiments, ring assembly 16 can additionally perform intervention operations on tubular string 14, bore 12, or the formation surrounding bore 12. In order to perform intervention operations, ring assembly 16 can include a structural ring 20 with integrated intervention tool 28. Intervention tool 28 can be, for example: a cutting surface or blade to remove an obstruction or bore 12 or to release a stuck pipe; an injection assembly for injecting cement or a polymer into tubular string 14, bore 12 or the formation adjacent to bore 12; a tool with a bit for drilling into an inner diameter surface of bore 12; or a collection assembly for collecting a sample of fluid or solid material from bore 12 or the formation adjacent to bore 12 for retrieval to the surface or for analysis.

Looking at FIG. 3, structural ring 20 can be sized with a ring inner diameter 30 to circumscribe tubular string 14. Structural ring 20 has a ring outer diameter 32 sized to fit within bore 12 of subterranean well 10.

In order to be secured around tubular string 14 at the surface without having to drop ring assembly 16 over a top end of tubular string 14, structural ring 20 can be a jointed member with latching mechanism 34. Latching mechanism 34 can connect ends of the jointed member. Latching mechanism 34 can be, for example, a ratchet type connection, a pinned connection, a male and female type connection, or other suitable type connection that can connect the ends of the jointed member. The jointed structural ring 20 is moveable between an open position and a closed position. In the open position structural ring 20 is operable to be positioned around a joint of the tubular string 14 across tubular string 14 from the side of tubular string 14. In such an embodiment, systems and methods of the current application can provide ring assembly 16 that can be lowered from the surface at any time around tubular string 14, as needed.

Alternately, ring assembly 16 can be secured to the outer diameter of tubular string 14 and carried into bore 12 with tubular string 14. In such an embodiment, ring assembly 16 can have a connection mechanism that is releasable to release ring assembly 16 from tubular string 14. This may be particularly useful, for example in deviated wells.

In the example embodiment of FIG. 3, antenna 36 can extend from ring assembly 16. Antenna 36 can be formed of a flexible material, such as plastic, so that antenna 36 can bend when passing by a sidewall of bore 12 or an obstruction within bore 12. Antenna 36 can be used with communication and control assembly 22 for gathering data and relaying gathered data to and from communication and control assembly 22 or the surface.

Figure 5:
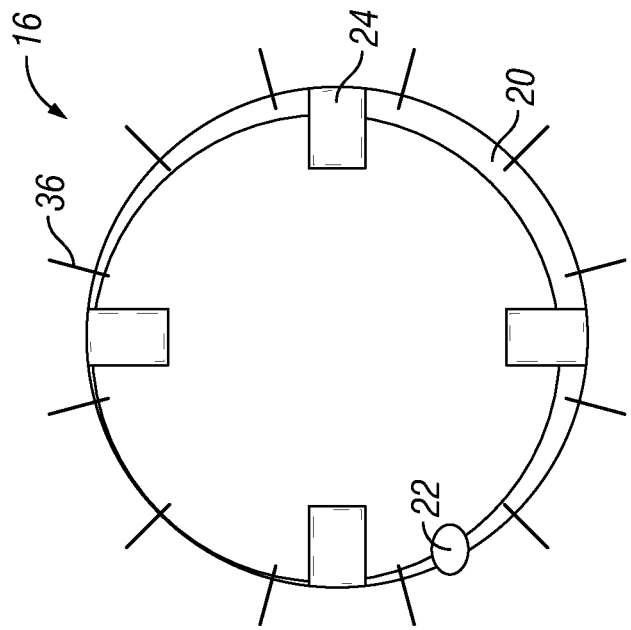
FIG. 5 is schematic plan view of a ring assembly, in accordance with an embodiment of this disclosure, shown with a varied sidewall thickness.
Figure 4:
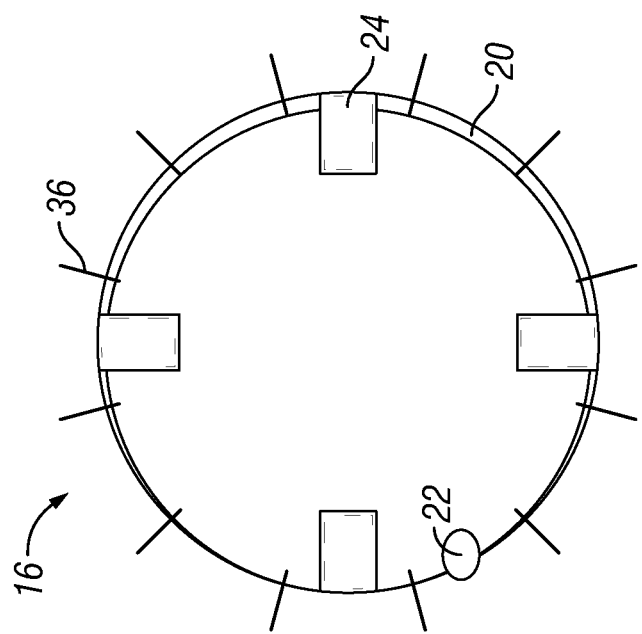
FIG. 4 is schematic plan view of a ring assembly, in accordance with an embodiment of this disclosure, shown with a varied sidewall thickness.

Looking at FIGS. 4-5, in examples where there is limited distance between the outer diameter of tubular string 14 and the inner diameter surface of bore 12, structural ring 20 can have a varying sidewall thickness. In the example of FIG. 4, structural ring 20 can have a first sidewall thickness over one half of the circumference of structural ring 20 and a varying sidewall thickness over a second half of the circumference of structural ring 20. In the example of FIG. 5, structural ring 20 can have a varying sidewall thickness around the entire circumference of structural ring 20. In the examples of FIGS. 4-5, the logging and measuring equipment can be located in the wider sidewall section of structural ring 20 so that the remaining section of structural ring can be slimmed down to fit within bore 12.

Figure 6:
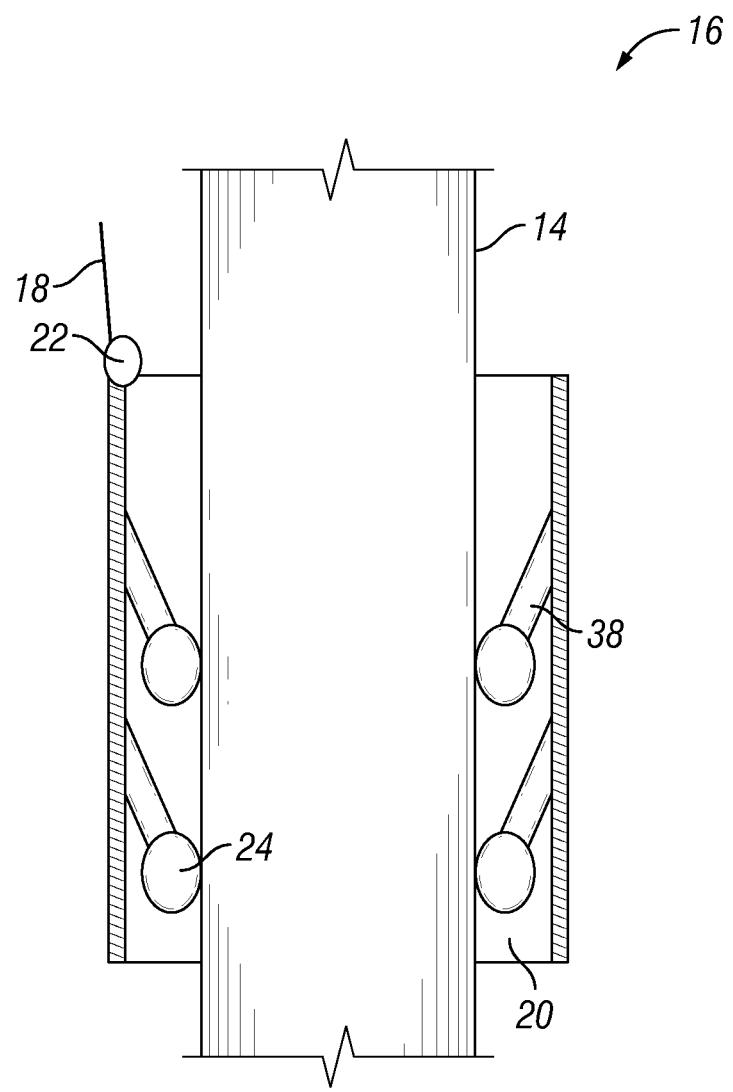
FIG. 6 is a schematic section view of a ring assembly surrounding a tubular string, in accordance with an embodiment of this disclosure.

Looking at FIG. 6, in an example embodiment wheels 24 are biased radially outward by arms 38. Arm 38 is secured at a first end to an inner diameter of structural ring 20 in a manner that allows arm 38 to rotate relative to structural ring 20. Arm 38 is secured at a second end to a wheel 24.

In an example of operation, in order to perform logging, measuring, or intervention operations within bore 12, ring assembly 16 can be positioned around tubular string 14. When ring assembly 16 includes a jointed structural ring 20 ring assembly 16 can be positioned around tubular string 14 at the surface at any time. Ring assembly 16 can have sufficient weight so that gravity can pull ring assembly 16 into bore 12. Control line 18 can manage the descent of ring assembly 16 into bore 12 and maintain the position of ring assembly 16 at the target region of bore 12.

In alternate embodiments, ring assembly 16 can be secured to tubular string 14 and lowered with tubular string 14 into bore 12. Ring assembly 16 can then be detached from tubular string at a desired location within bore 12. In yet another alternate embodiments, ring assembly 16 can be moved within bore 12 by a motor of communication and control assembly 22.

Wheels 24 of ring assembly 16 can allow structural ring 20 to both rotate around tubular string 14 or to move axially along tubular string 14 and can permit structural ring 20 to pass over joint connections and other obstructing members of tubular string 14. Ring assembly 16 can be moved uphole or downhole along tubular string 14 by control line 18, a slickline, or a motor of communication and control assembly 22.

Measurement tool 26 can perform logging and measuring operations within bore 12. Measurement tool 26 can allow for logging and measuring operations within bore 12 independently of the axial movement of tubular string 14 or the location of the bottom hole assembly. Systems and methods of this disclosure allow for the gathering of data over time, in order to observe time dependent changes, such as swelling, hole collapse, or casing failure during drilling operations. Some current LWD techniques are performed with drilling operations slowed or stopped. Systems and methods of this disclosure allow for drilling to continue independent of logging and measuring operations. Because embodiments of this disclosure can provide real time data continuously, intermittently, or on demand over the length of tubular string 14, systems and methods of this disclosure can provide improved data over current methods that rely on a LWD system that is part of the bottom hole assembly.

Systems and method of this disclosure can provide important real time information relating to the subterranean well such as the quality of the cement bond, the pressure and temperature of the formation, the mudflow rate, well geometry, well integrity, formation gamma ray and resistivity, and can provide an early kick detection warning.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for measuring properties within a subterranean well, the system having:
    a ring assembly including:
        a structural ring sized with a ring inner diameter to circumscribe a tubular string and a ring outer diameter to fit within a bore of the subterranean well;
        a measurement tool integrated with the structural ring; and
        wheels spaced around an inner diameter surface of the structural ring;
    where
        the structural ring is a jointed member moveable between an open position and a closed position, where in the open position the structural ring is operable to be positioned around a joint of the tubular string.

2. The system of claim 1, where the measurement tool is a logging tool.

3. The system of claim 1, where the measurement tool is selected from the group consisting of a scanner, a camera, a pressure sensor, a temperature sensor, flow sensor, a caliper sensor, and combinations thereof.

4. The system of claim 1, where the measurement tool is a scanner directed towards the tubular string, the scanner operable to assess the tubular string.

5. The system of claim 1, where the ring assembly further includes an axial movement system operable to move the ring assembly downhole and uphole within the subterranean well.

6. The system of claim 5, where the axial movement system includes a motor operable to move the ring assembly within the subterranean well.

7. The system of claim 1, where the ring assembly further includes a communication system operable to provide real time data to a surface from the measurement tool.

8. The system of claim 1, where the structural ring includes a latching mechanism, the latching mechanism operable to connect ends of the jointed member.

9. A method for measuring properties within a subterranean well, the method including:
    positioning a ring assembly around a tubular string, the ring assembly including:

a structural ring sized with a ring inner diameter to circumscribe the tubular string and a ring outer diameter to fit within a bore of the subterranean well;
a measurement tool integrated with the structural ring; and
wheels spaced around an inner diameter surface of the structural ring; and
measuring a property within the subterranean well with the measurement tool; where
the structural ring is a jointed member moveable between an open position and a closed position and the method further includes positioning the structural ring around a joint of the tubular string with the jointed member in the open position.

10. The method of claim 9, where the measurement tool is a logging tool.

11. The method of claim 9, where the measurement tool is selected from the group consisting of a scanner, a camera, a pressure sensor, a temperature sensor, flow sensor, a caliper sensor, and combinations thereof.

12. The method of claim 9, where the measurement tool is a scanner directed towards the tubular string, and the method includes scanning the tubular string to assess the property of the tubular string.

13. The method of claim 9, where the ring assembly further includes an axial movement system, and the method further includes moving the ring assembly downhole and uphole within the subterranean well with the axial movement system.

14. The method of claim 13, where the axial movement system includes a motor and the method further includes moving the ring assembly within the subterranean well with the motor.

15. The method of claim 9, where the ring assembly further includes a communication system and the method further includes providing real time data to a surface from the measurement tool with the communication system.

16. The method of claim 9, where the structural ring includes a latching mechanism and the method further includes connecting ends of the jointed member with the latching mechanism.

17. A system for measuring properties within a subterranean well, the system having:
a ring assembly including:
a structural ring sized with a ring inner diameter to circumscribe a tubular string and a ring outer diameter to fit within a bore of the subterranean well;
a measurement tool integrated with the structural ring; and
wheels spaced around an inner diameter surface of the structural ring;
where
the measurement tool is a scanner directed towards the tubular string, the scanner operable to assess the tubular string.

18. A method for measuring properties within a subterranean well, the method including:
positioning a ring assembly around a tubular string, the ring assembly including:
a structural ring sized with a ring inner diameter to circumscribe the tubular string and a ring outer diameter to fit within a bore of the subterranean well;
a measurement tool integrated with the structural ring; and
wheels spaced around an inner diameter surface of the structural ring; and
measuring a property within the subterranean well with the measurement tool; where
the measurement tool is a scanner directed towards the tubular string, and the method includes scanning the tubular string to assess the property of the tubular string.

* * * * *